(12) United States Patent
Ookata (10) Patent No.: US 6,402,955 B2
(45) Date of Patent: Jun. 11, 2002

(54) METHOD FOR OPERATING A MEMBRANE FILTER HAVING A GAS DISCHARGE CLEANING MEANS

(75) Inventor: Masanobu Ookata, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/891,241

(22) Filed: Jun. 27, 2001

Related U.S. Application Data (62) Division of application No. 09/207,336, filed on Dec. 8, 1998, now Pat. No. 6,284,135.

(30) Foreign Application Priority Data

Dec. 16, 1997 (JP) ............................................. 9-346605

(51) Int. Cl.[7] .......................... B01D 24/46; B01D 65/02
(52) U.S. Cl. ..................... 210/636; 210/650; 210/794
(58) Field of Search ................................. 210/791, 794, 210/767, 636, 321.69, 332, 334, 346, 407, 208, 220, 650

(56) References Cited

U.S. PATENT DOCUMENTS 5,910,250 A * 6/1999 Mahendran et al.

FOREIGN PATENT DOCUMENTS

| JP | 4-70958 | 11/1992 |
| JP | 8-281080 | * 11/1992 |
| JP | 7-20592 | 3/1995 |
| JP | 8-281083 | 10/1996 |

* cited by examiner

Primary Examiner—Joseph W. Drodge
Assistant Examiner—Terry K. Cecil
(74) Attorney, Agent, or Firm—Arent Fox Kintner Plotkin & Kahn (57) ABSTRACT

Operation of a membrane filter includes the step of selectively supplying gas into the compartments of a membrane unit 50 composed of an array of membrane elements 51 disposed within a treatment tank 31. A skirt element 71 is disposed at a bottom portion of the membrane unit and an aerator 61 is disposed under the skirt. A partition is also disposed at the bottom of the membrane unit forming compartments within the shirt element. The gas bubbles discharged from the aerator increase their rising force upon entry into gaps between the membranes. Because of the arrangement of the partition within the skirt element the flow rate of bubbles along the opposite side edge portions of the membrane unit can be increased having the advantage of cleaning the entire surface of each membrane, thereby preveting clogging by sludge, SS, colloid, etc. within the gaps between the membranes. Therefore, filtration can be maintained over a longer period of time and the power required for filtration can be reduced, as well as, the frequency of manual periodic cleaning, chemical cleaning, etc.

1 Claim, 10 Drawing Sheets

FIG. 1

PRIOR ART

METHOD FOR OPERATING A MEMBRANE FILTER HAVING A GAS DISCHARGE CLEANING MEANS

This is a division of application No. 09/207,336 filed Dec. 8, 1998, now U.S. Pat No 6,284,135. The disclosure of the prior application(s) is hereby incorporated by reference herein in its entirety.

BACKGROUND OF THE INVENTION

1. Field of the Invention

The present invention relates to an immersion type membrane filter apparatus and a method for operating the membrane filter apparatus.

2. Description of the Related Art

Conventionally, solid-liquid separation has been performed in many instances of waste water treatment, collection of valuable substances in water, and like treatments. A solid-liquid separation method employs a membrane filter apparatus which uses a membrane unit composed of a plurality of membrane elements, such as precision filtration membranes or ultrafiltration membranes. In this case, in the membrane element, pressure is applied on the side of water to be treated, or a negative pressure is generated on the side of treated water with respect to each membrane, so that only water permeates through the membranes.

However, in the membrane element, adhesion to the membrane surface of solid matter such as suspended solid causes generation of filtration resistance in addition to resistance intrinsic to the membrane material itself. As adhesion of solid matter proceeds, the associated filtration resistance increases, impairing permeability of the membrane element. In the case of fixed-rate filtration, the pressure difference between untreated water and treated water, i.e., the differential filtration pressure, increases. As a result, energy required for filtration increases. In the case of fixed-pressure filtration, the water permeation rate, i.e., the rate of water permeating through the membrane, decreases. Thus, there is provided a membrane filter apparatus in which the velocity of water flowing along membrane surfaces is increased, or in which the membrane surfaces are cleaned by means of, for example, sponge balls or carriers, thereby minimizing adhesion of solid matter to the membrane surfaces.

In the case of an immersion-type membrane filter apparatus, in which a membrane unit is immersed in water, an aerator is disposed under the membrane element so as to discharge air for aeration of membranes. An air lift action of the discharged air causes a shear force to be applied to membrane surfaces, thereby cleaning the membrane surfaces by means of a mixed flow of air and water (refer to Japanese Patent Publication No. 4-70958).

To uniformly and efficiently supply air discharged from the aerator into gaps between membranes, the membrane unit is disposed within an enclosure, which is open upward and downward, and the aerator is disposed within the enclosure at a lower portion thereof (refer to Japanese Patent Publication No. 7-20592). Alternatively, the membrane unit is disposed within the enclosure, which is open upward and downward, the aerator is disposed within the enclosure at a lower portion thereof, and flow-smoothing means is disposed between the membrane unit and the aerator (refer to Japanese Patent Laid-Open (kokai) No. 8-281080) or a skirt member is disposed at the lower end of the membrane unit (refer to Japanese Patent Laid-Open (kokai) No. 8-281083).

The conventional immersion-type membrane filter apparatus can uniformly supply air discharged from the aerator into each gap between membranes, but involves a problem that, as air rises within each gap between membranes, a flow of bubbles is gradually biased toward a widthwise central portion of the membrane surface.

Figure 1:
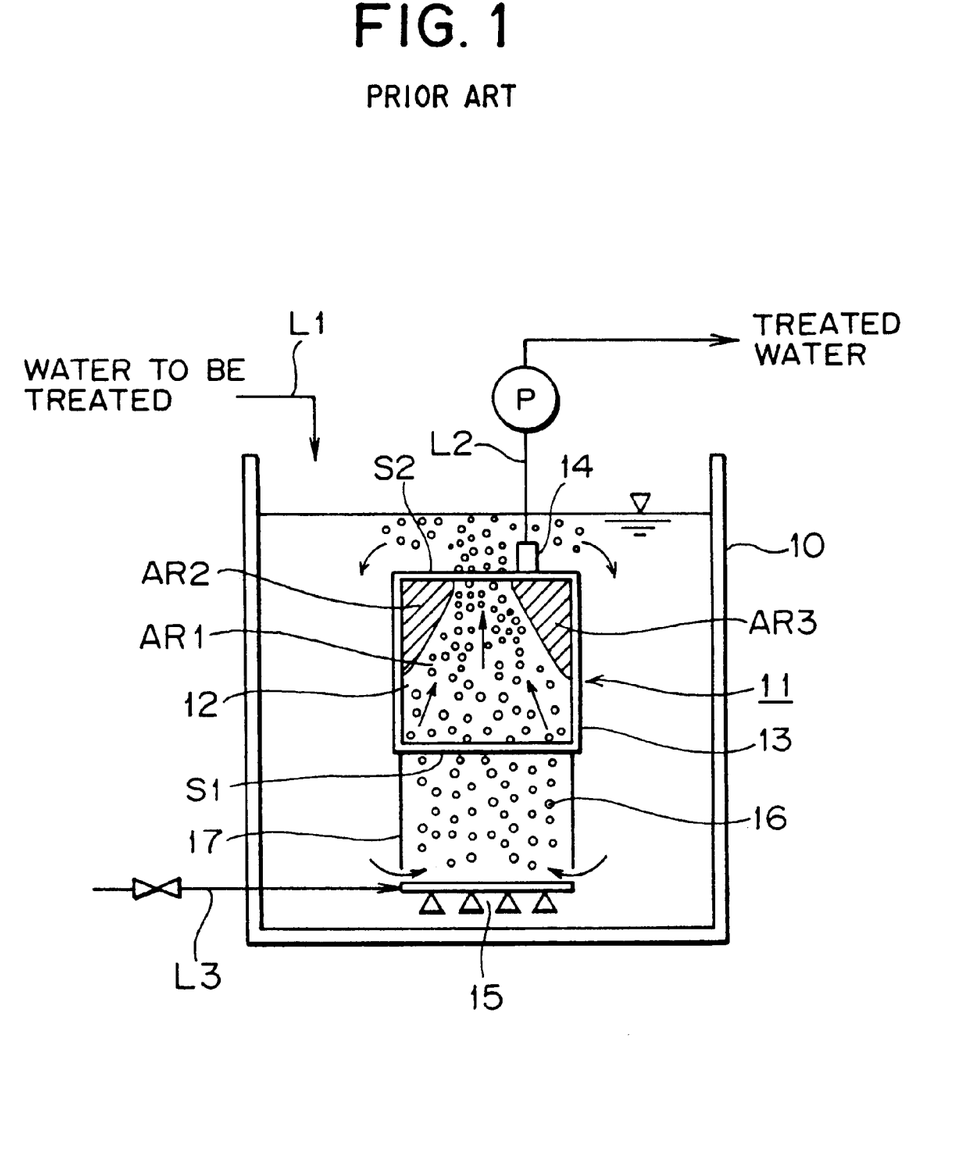
FIG. 1 is a schematic view of a conventional immersion-type membrane filter apparatus.

FIG. 1 shows a schematic view of a conventional immersion-type membrane filter apparatus.

In FIG. 1, numeral 10 denotes a treatment tank for accommodating water to be treated, which is supplied thereinto through a line L1; numeral 11 denotes a membrane element; numeral 12 denotes a membrane; numeral 13 denotes a frame; numeral 14 denotes a water manifold nozzle attached to the top end of the frame 13; and a line L2 for discharging treated water is connected to the water manifold nozzle 14. A pump P is disposed in the line L2 in order to pump out treated water. A plurality of membrane elements 11 are arrayed adjacent to each other to constitute a membrane unit.

An aerator 15 is disposed under the membrane unit for cleaning the surfaces of the membranes 12, and is connected to an unillustrated air source through a line L3. Air discharged from the aerator 15 is supplied, in the form of bubbles 16, to the membrane element 11 uniformly along an entire bottom end S1 thereof. The bubbles 16, together with water, rise within each gap between the membranes 12. To guide air discharged from the aerator 15 upward, a skirt element 17 is disposed between the membrane unit and the aerator 15.

Since the membrane elements 11 extend along a predetermined length within the treatment tank 10, the opposite side edge portions of the frame 13 and water to be treated present in the vicinity of the edge portions produce resistance to the bubbles 16 which are rising within each gap between the membranes 12. Accordingly, as the bubbles 16 rise within each gap between the membranes 12, the bubbles 16 are gradually biased toward a widthwise central portion of the surface of the membrane 12. As a result, the amount of the bubbles 16 is reduced at the opposite side portions of a top end S2 of each membrane element 11. That is, the bubbles 16 flow at a relatively high rate in a trapezoidal region AR1 and at a relatively low rate in triangular regions AR2 and AR3. Consequently, sludge is removed by action of the bubbles 16 from the surface of the membrane 12 in the region AR1, whereas sludge tends to adhere to the surface of the membrane 12 in the regions AR2 and AR3 due to impairment in the cleaning effect of the bubbles 16, thus failing to clean the entire surface of the membrane 12. Further, the gaps between the membranes 12 are clogged with sludge, SS, colloid, or a like substance, resulting in a failure to maintain good filtration over a long period of time.

SUMMARY OF THE INVENTION

An object of the present invention is to solve the above-mentioned problems in the conventional membrane filter apparatus and to provide a membrane filter apparatus capable of cleaning the entire surface of a membrane and maintaining good filtration over a long period of time, as well as to provide a method for operating the membrane filter apparatus.

To achieve the above object, the present invention provides a membrane filter apparatus comprising a treatment tank, a membrane unit, a tubular (rectangular-tube-like) skirt element, an aerator, a partition, and gas supply means. The membrane unit is disposed within the treatment tank and is composed of an array of membrane elements. The skirt element is disposed at a bottom portion of the membrane unit. The aerator is disposed under the skirt element for the purpose of discharging gas. The partition is disposed at a bottom portion of the membrane unit and, together with the skirt element, defines a compartment within the skirt element. The gas supply means supplies gas into the compartment.

The gas discharged from the aerator becomes bubbles. The bubbles are supplied into and rise within the compartment, thereby increasing their rising force upon entry into gaps between membranes.

Since the gas is supplied into the compartment by the gas supply means, the flow rate of bubbles along the opposite side edge portions of the membrane unit can be increased while the bubbles are flowing upward within the gaps between the membranes.

Accordingly, the entire surface of each membrane can be cleaned, thereby preventing clogging by sludge, SS, colloid, or a like substance within each gap between the membranes and thus preventing an increase in filtration resistance. Therefore, good filtration can be maintained over a long period of time.

Further, power required for filtration can be reduced, and the frequency of manual periodic cleaning, chemical cleaning, or like cleaning can be decreased.

Preferably, the skirt element has a rectangular cross section, and the compartment is formed along two walls of the skirt element.

Preferably, the skirt element has a rectangular cross section, and the compartment is formed along four walls of the skirt element.

Preferably, a plurality of the compartments are formed.

Preferably, the gas supply means supplies the gas into the compartments independently of each other.

The present invention provides another membrane filter apparatus comprising a treatment tank, a membrane unit, a tubular skirt element, an aerator, and a partition. The membrane unit is disposed within the treatment tank and is composed of an array of membrane elements. The skirt element is disposed at a bottom portion of the membrane unit. The aerator is disposed under the skirt element for the purpose of discharging gas. The partition is disposed at a bottom portion of the membrane unit and, together with the skirt element, defines a compartment within the skirt element.

The partition is slanted such that its bottom end is biased toward the center of the skirt element.

In this case, the compartment narrows upward, thereby increasing the rising velocity of bubbles and water to be treated within the compartment.

Also, when gas is discharged from the aerator, more bubbles are supplied into the compartment. Accordingly, more bubbles flow upward along the opposite side edge portions of the surface of each membrane, thereby sufficiently cleaning the surface of the membrane.

Preferably, the membrane filter apparatus further comprises gas supply means for supplying gas into the compartment.

In this case, since the gas supply means supplies the gas into the compartment, the flow rate of bubbles along the opposite side edge portions of the membrane unit can be further increased while the bubbles are flowing upward within the gaps between the membranes.

The present invention provides a method for operating a membrane filter apparatus, which comprises a treatment tank; a membrane unit disposed within the treatment tank and composed of an array of membrane elements; a skirt element disposed so as to extend from a bottom portion of the membrane unit and divided into a plurality of compartments; and an aerator disposed under the skirt element.

Gas is selectively supplied into the compartments.

The gas discharged from the aerator is supplied into and rise within the compartments, thereby increasing a rising force of bubbles upon entry into gaps between membranes.

Also, since the gas is supplied into the compartments, the flow rate of bubbles along the opposite side edge portions of the membrane unit can be increased while the bubbles are flowing upward within the gaps between the membranes.

Accordingly, the entire surface of each membrane can be cleaned, thereby preventing clogging by sludge, SS, colloid, or a like substance within the gaps between the membranes and thus preventing an increase in filtration resistance. Therefore, good filtration can be maintained over a long period of time.

Further, power required for filtration can be reduced, and the frequency of manual periodic cleaning, chemical cleaning, or like cleaning can be decreased.

BRIEF DESCRIPTION OF THE DRAWINGS

The structure and features of a membrane filter apparatus and a method for operating the membrane filter apparatus according to the present invention will be readily appreciated as the same becomes better understood by referring to the drawings, in which.

DESCRIPTION OF PREFERRED EMBODIMENTS

Embodiments of the present invention will next be described in detail with reference to the drawings.

Figure 2:
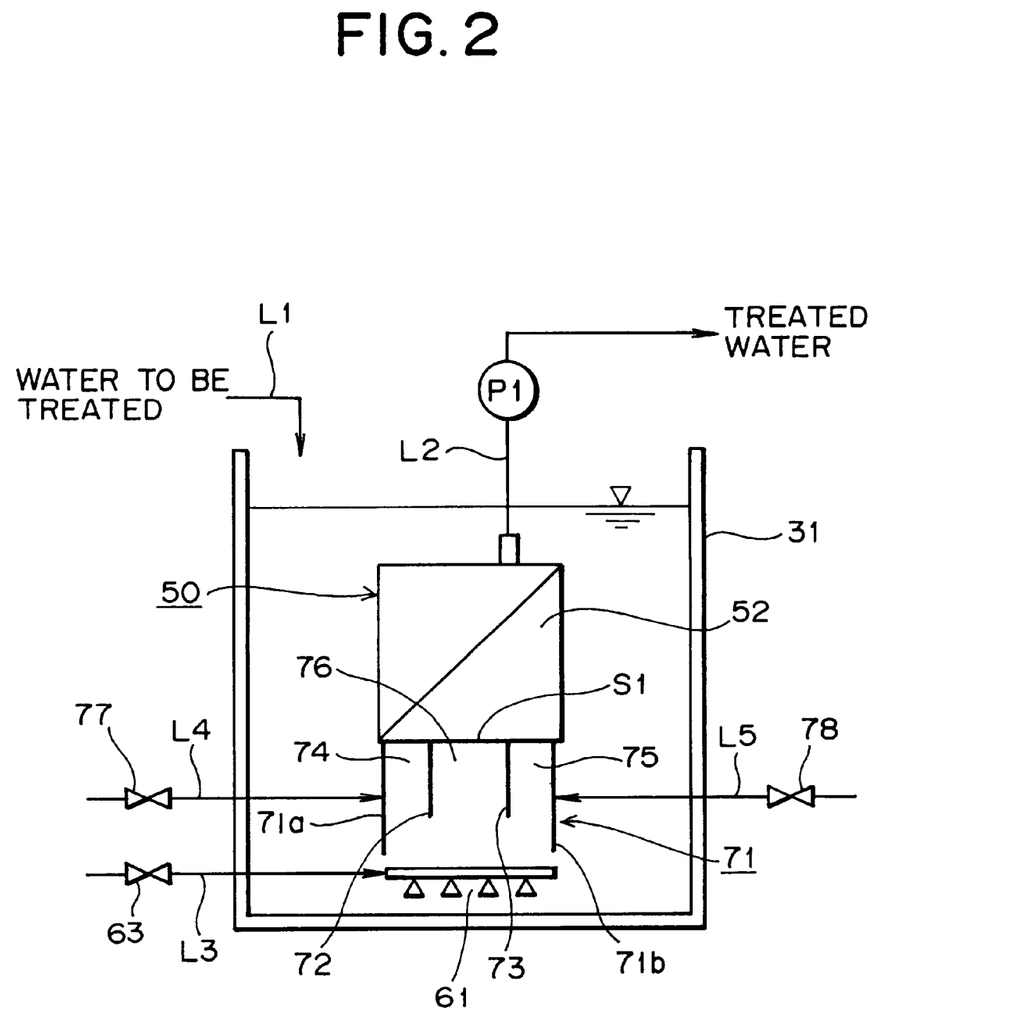
FIG. 2 is a schematic view of a membrane filter apparatus according to a first embodiment of the present invention.
Figure 3:
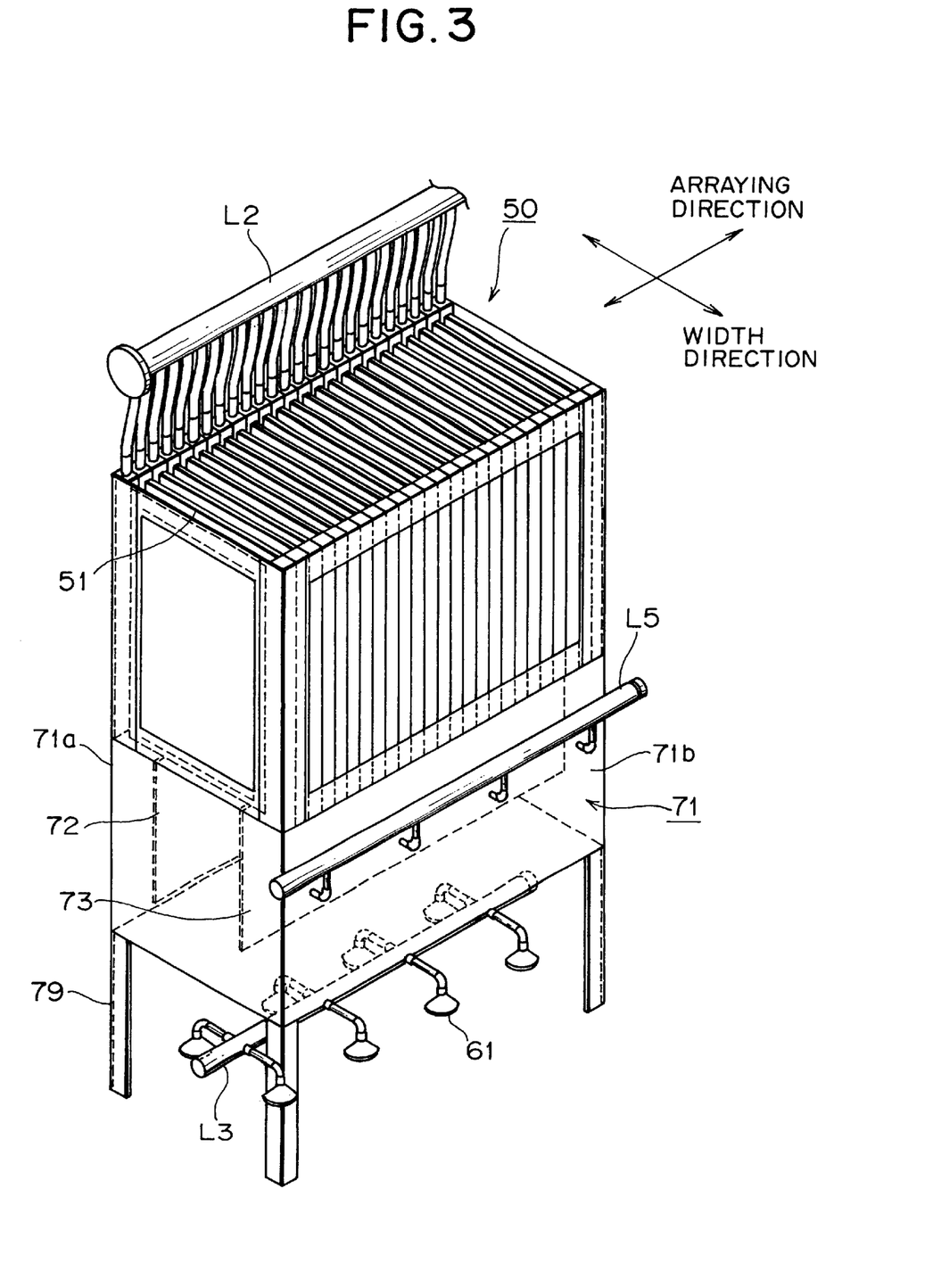
FIG. 3 is a perspective view of the membrane filter apparatus according to the first embodiment.
Figure 4:
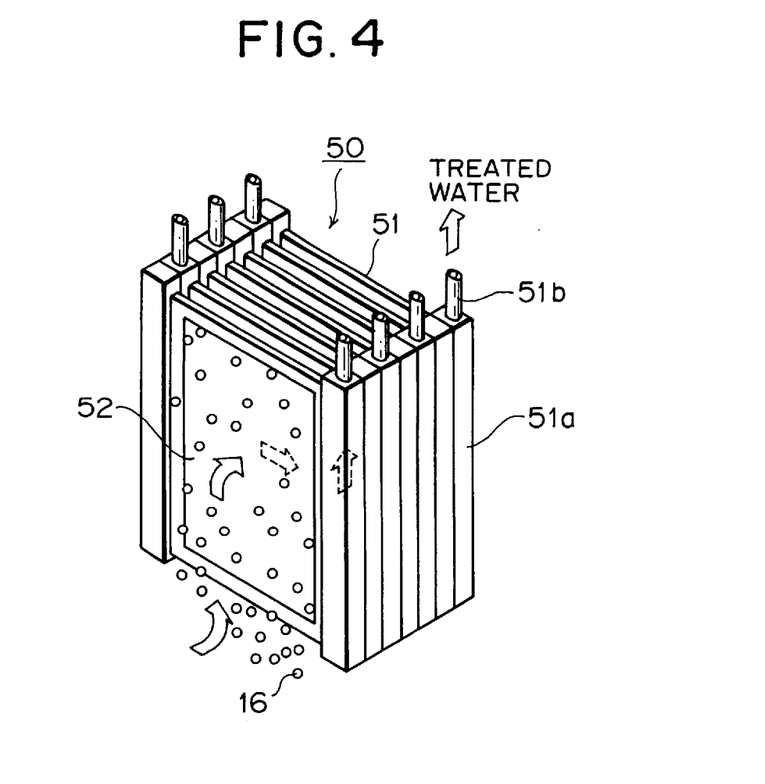
FIG. 4 is a perspective view of a membrane unit according to the first embodiment.
Figure 5:
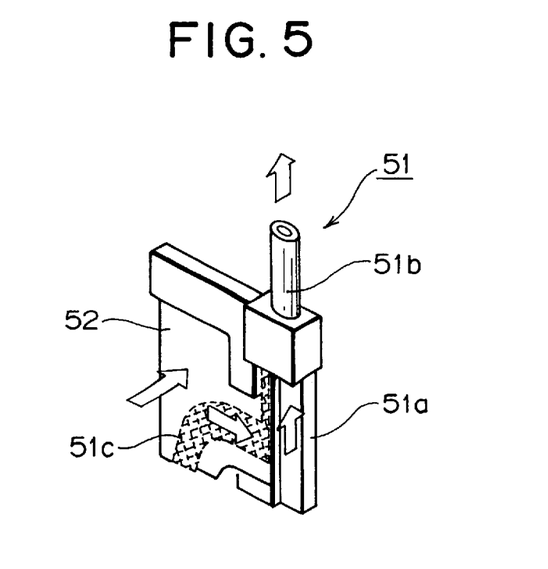
FIG. 5 is a perspective view of a main portion of a membrane element according to the first embodiment.

FIG. 2 shows a schematic view of a membrane filter apparatus according to a first embodiment of the present invention. FIG. 3 shows a perspective view of the membrane filter apparatus according to the first embodiment. FIG. 4 shows a perspective view of a membrane unit according to the first embodiment. FIG. 5 shows a perspective view of a main portion of a membrane element according to the first embodiment.

In FIGS. 2 to 5, numeral 31 denotes a treatment tank for accommodating water to be treated which is supplied through a line L1. Numeral 50 denotes a membrane unit immersed in water to be treated which is contained in the treatment tank 31. The membrane unit 50 includes a plurality of flat membrane elements 51 which are arrayed at predetermined intervals such that membrane surfaces 52 extend vertically as shown in FIG. 3. The gap between the membrane surfaces 52 is usually 5 to 15 mm.

The membrane element 51 includes a membrane, such as a precision filtration membrane or an ultrafiltration membrane, and is equipped with a hollow frame 51a along its side edge. Treated water (permeated water), or water which has permeated the membrane, is collected into the frame 51a. A spacer 51c is disposed on the treated-water side of each membrane surface 52.

The top end of each frame 51a is connected to a line L2 via a manifold nozzle 51b. A pump P1 is disposed in the line L2. The pump P1 is driven under control of an unillustrated controller so as to generate a negative pressure within each membrane element 51, thereby withdrawing water into the membrane element 51. The filtration rate of water or the permeation rate of water is regulated through adjustment of the rotational speed of the pump P1 under control of the controller.

In the thus-configured membrane filter apparatus, when water to be treated is supplied thereinto through the line L1, and the pump P1 is driven, only water permeates through the membrane of the membrane element 51. In this case, when unillustrated solid matter such as suspended matter adheres to the membrane surface 52, the adhering solid matter causes generation of filtration resistance in addition to resistance intrinsic to the membrane material itself. As adhesion of solid matter proceeds, the associated filtration resistance increases, impairing the permeability of the membrane element 51.

Thus, a mixed flow of gas and water is adapted to sweep and thereby clean the membrane surface 52, thereby minimizing adhesion of solid matter onto the membrane surface 52.

To implement the above cleaning of the membrane surfaces 52, an aerator 61 is disposed under the membrane unit 50. The aerator 61 is connected to an unillustrated air source through a line L3. A regulating valve 63 is disposed in the line L3. The controller regulates the opening of the regulating valve 63 in order to regulate the discharge rate of air, which serves as gas of the present invention, from the aerator 61, thereby regulating the flow rate of a mixture of air and water along the membrane surfaces 52. In the present embodiment, the supply rate of air into each gap between the membrane surfaces 52 as represented by linear velocity (LV) is 0.05 to 3 m/min.

A skirt element 71 in the form of an open-ended rectangular enclosure is disposed between the membrane unit 50 and the aerator 61 in order to guide and smooth a flow of air discharged from the aerator 61. The skirt element 71 is open upward and downward and is attached to a bottom portion of the membrane unit 50. The skirt element 71 may assume the form of a cylindrical enclosure, a polygonal enclosure, or any other type of enclosure according to the shape of the membrane unit 50.

During filtration through the membrane element 51 of water to be treated, air discharged from the aerator 61 is supplied, in the form of bubbles 16, into each gap between the membrane surfaces 52 and uniformly along an entire bottom end S1 of the membrane element 51. The bubbles 16, together with water, rise within each gap between the membrane surfaces 52. As a result, an air lift action of the discharged air causes a shear force to be applied to the membrane surfaces 52, thereby cleaning the membrane surfaces 52. Subsequently, the bubbles 16 are released into the atmosphere from the top of the treatment tank 31, whereas water to be treated is circulated downward along walls of the treatment tank 31.

Since the membrane elements 51 extend along a predetermined length within the treatment tank 31, the frames 51a, or the opposite side edge portions of the membrane elements 51, and water to be treated present in the vicinity of the frames 51a are resistant to the bubbles 16 which, together with water to be treated, are rising within each gap between the membrane surfaces 52. Accordingly, as the bubbles 16 rise within each gap between the membrane surfaces 52, the bubbles 16 tend to be gradually biased toward the widthwise central portion of each membrane surfaces 52.

To cope with the biasing tendency of the bubbles 16, partitions 72 and 73 are disposed within a space defined by the skirt element 71 at two widthwise opposite positions of the membrane unit 50 such that they extend along the longitudinal direction of the membrane unit 50, i.e., along the arraying direction of the membrane elements 51. The partitions 72 and 73 are in parallel with side walls 71a and 71b of the skirt element 71. The partitions extend downwardly from the membrane unit 50 a major portion of the distance between the ends of the skirt element 71. Thus, the partitions 72 and 73 and the side walls 71a and 71b define compartments 74 and 75, respectively, while the partitions 72 and 73 define a compartment 76. Numeral 79 denotes a base frame. The skirt element 71 and the partitions 72 and 73 constitute a partition unit.

The number of compartments can be increased as needed by increasing the number of partitions. However, an increase in the number of compartments complexes the structure of the membrane filter apparatus. To maintain good state of mixing of air and water to be treated and good fluidity of the mixture, the partitions 72 and 73 are preferably disposed symmetrically with respect to the center of the membrane unit 50.

The gap between the skirt element 71 and the partitions 72 and 73 is determined according to the size of the membrane element 51 and the membrane unit 50. For example, for the membrane unit 50 having a width of about 1 m, the gap is set to 1 to 10 cm.

An unillustrated air source is connected to the compartments 74 and 75 through lines L4 and L5, respectively, so that air can be supplied into the compartments 74 and 75 independently of each other. Regulating valves 77 and 78 are disposed in the lines L4 and L5, respectively. The controller can regulate the opening of the regulating valves 77 and 78 to thereby regulate the rate of air supplied into the compartments 74 and 75. Gas other than air can be supplied into the compartments 74 and 75. The lines L4 and L5, the regulating valves 77 and 78, and the air source constitute the gas supply means of the invention.

The lines L4 and L5 may be disposed independently of the line L3 or may be permitted to branch off from the line L3. Further, another aerator may be disposed under or within each of the compartments 74 and 75 and be connected to each of the lines L4 and L5.

Since, in the internal space of the skirt element 71, the compartments 74 and 75 are formed along the side walls of the skirt element 71 while the compartment 76 is interposed between the compartments 74 and 75, air discharged from the aerator 61 rises, in the form of the bubbles 16, within the compartments 74 to 76 while being guided by the partitions 72 and 73. Thus, when the bubbles 16 leave the compartments 74 and 75 and enter each gap between the membrane surfaces 52, a rising force of the bubbles 16 can be increased, thereby preventing the potential problem that, as the bubbles 16 rise within each gap between the membrane surfaces 52, the bubbles 16 are gradually biased toward a widthwise central portion of the membrane surface 52. The partitions 72 and 73 are disposed in close contact with a bottom portion of the membrane unit 50 in order to prevent the bubbles 16 from communicating between the compartment 76 and the compartments 74 and 75.

Since air is supplied into the compartments 74 and 75, the flow rate of the bubbles 16 along the opposite side edge portions of the membrane element 51 can be increased while the bubbles 16 are flowing upward within each gap between the membrane surfaces 52.

Accordingly, the entire membrane surface 52 can be cleaned, thereby preventing clogging by sludge, SS, colloid, or a like substance within each gap between the membrane surfaces 52 and thus preventing an increase in filtration resistance. Therefore, good filtration can be maintained over a long period of time.

Further, power required for filtration can be reduced, and the frequency of manual periodic cleaning, chemical cleaning, or like cleaning can be decreased.

Since the membrane unit 50 does not need to be accommodated within an enclosure, the size of the membrane filter apparatus can be reduced. Also, the structure of the membrane filter apparatus can be simplified.

Next, a method for operating the above-described membrane filter apparatus will be described.

Figure 6:
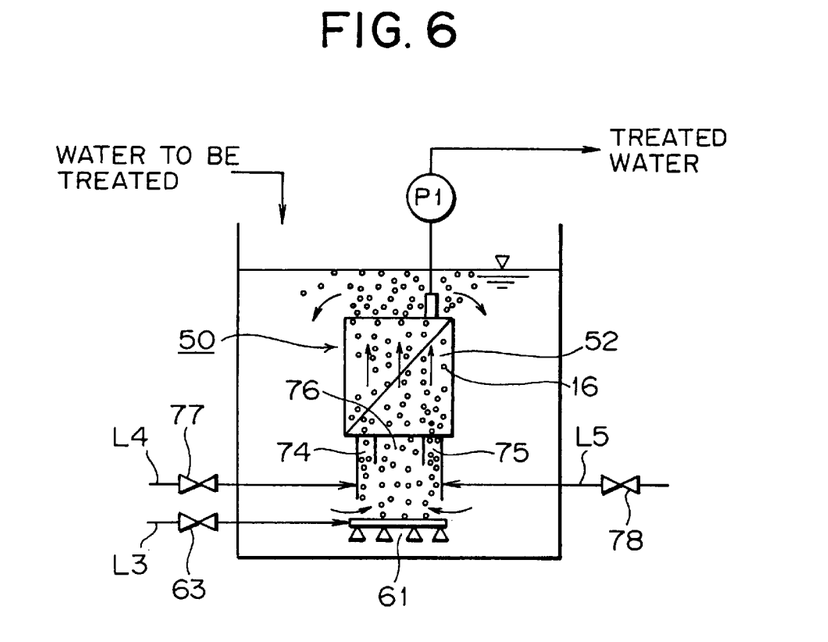
FIG. 6 is a view illustrating a first operation mode of the membrane filter apparatus according to the first embodiment.
Figure 7:
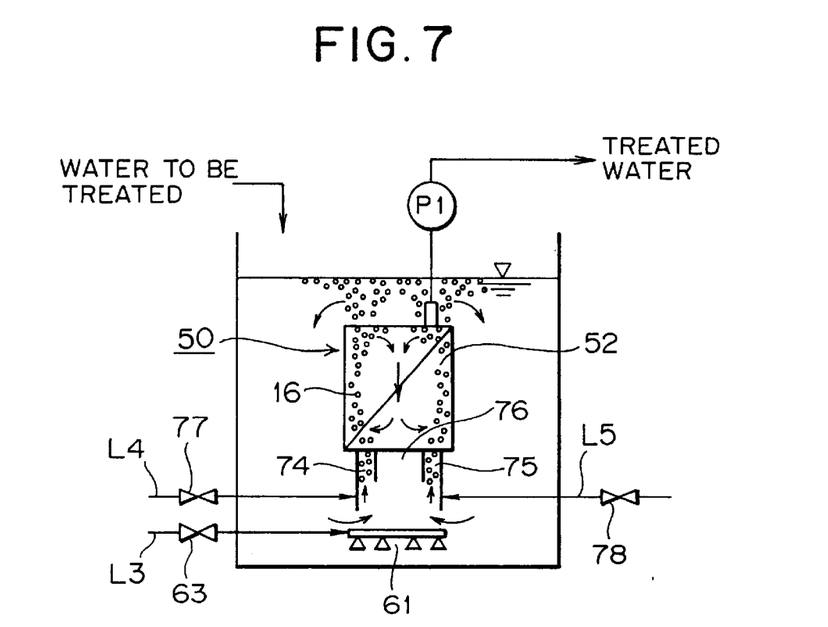
FIG. 7 is a view illustrating a second operation mode of the membrane filter apparatus according to the first embodiment.
Figure 8:
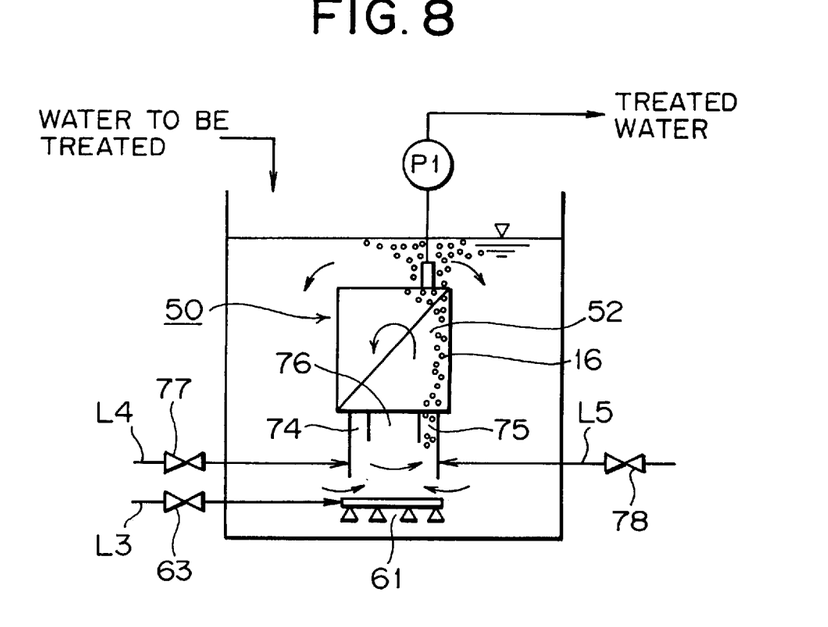
FIG. 8 is a view illustrating a third operation mode of the membrane filter apparatus according to the first embodiment.
Figure 9:
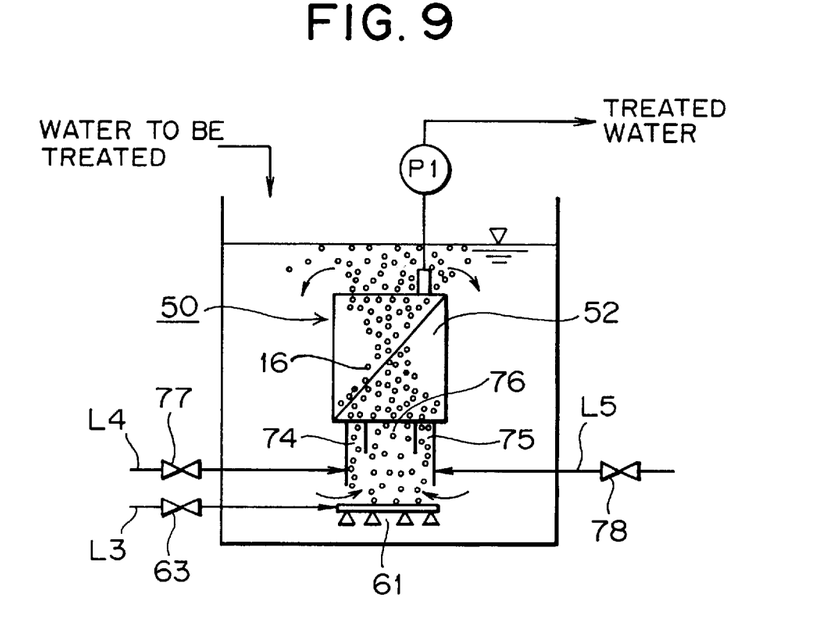
FIG. 9 is a view illustrating a fourth operation mode of the membrane filter apparatus according to the first embodiment.

FIG. 6 illustrates a first operation mode of the membrane filter apparatus according to the first embodiment. FIG. 7 illustrates a second operation mode of the membrane filter apparatus according to the first embodiment. FIG. 8 illustrates a third operation mode of the membrane filter apparatus according to the first embodiment. FIG. 9 illustrates a fourth operation mode of the membrane filter apparatus according to the first embodiment.

When the regulating valves 63, 77, and 78 are opened to thereby supply air into the compartments 74 to 76, the bubbles 16 flow upward over the entire membrane surface 52 as shown in FIG. 6. When the regulating valve 63 is closed and the regulating valves 77 and 78 are opened, to thereby supply air into only the compartments 74 and 75, the bubbles 16 flow upward mainly along the opposite side edge portions of the membrane surface 52 as shown in FIG. 7. When the regulating valves 63 and 77 are closed and the regulating valve 78 is opened, to thereby supply air into only the compartment 75, the bubbles 16 flow upward mainly along one side edge portion of the membrane surface 52 as shown in FIG. 8. When the regulating valves 77 and 78 are closed and the regulating valve 63 is opened, to thereby supply air into the compartments 74 to 76, the bubbles 16 flow upward mainly along a widthwise central portion of the membrane surface 52 as shown in FIG. 9.

Accordingly, through combination of the above operation modes, any portion of the membrane surface 52 can be cleaned.

For example, in continuous cleaning, the regulating valves 63, 77, and 78 are continuously opened. In combination of continuous cleaning and additional intermittent cleaning, the regulating valve 63 is continuously opened, and the regulating valves 77 and 78 are intermittently opened. In this case, the regulating valves 77 and 78 may be opened or closed concurrently or independently of each other.

In periodical intermittent cleaning, while the regulating valve 63 is temporarily closed, at least either the regulating valve 77 or 78 is opened. In this case, discharge of air from the aerator 61 is temporarily halted; thus, cleaning of a central portion of the membrane unit 50 becomes insufficient. Therefore, this intermittent cleaning is preferably completed within a short period of time. For example, the regulating valve 63 is closed for a time of 5 seconds to 5 minutes in a single cycle of intermittent cleaning, and this intermittent cleaning is performed 1 to 1500 cycles per day. Symbols L3 to L5 denote air lines, and symbol P1 denotes a pump.

Next, a second embodiment of the present invention will be described.

Figure 10:
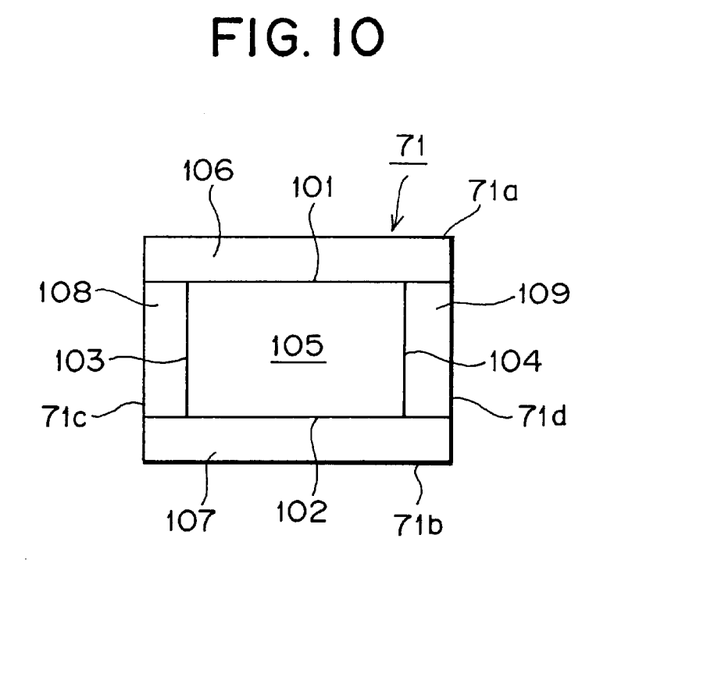
FIG. 10 is a plan view of a partition unit according to a second embodiment of the present invention.
Figure 11:
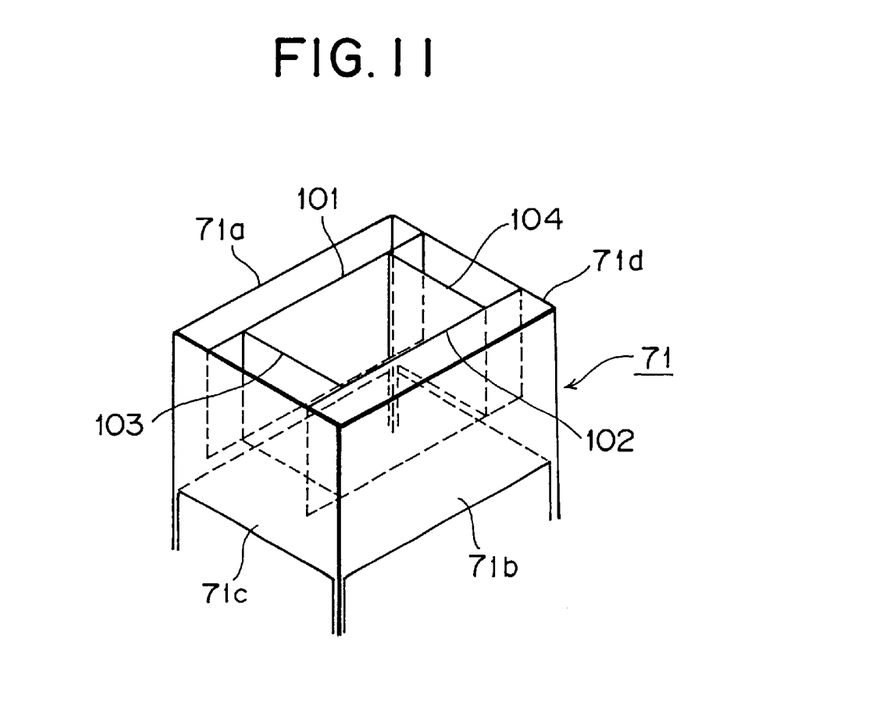
FIG. 11 is a perspective view of the partition unit according to the second embodiment.

FIG. 10 shows a plan view of a partition unit according to a second embodiment of the present invention. FIG. 11 shows a perspective view of the partition unit according to the second embodiment.

In the second embodiment, partitions 101 and 102 are disposed within a space defined by the skirt element 71 at two widthwise opposite positions of the membrane unit 50 (FIG. 4) such that they extend along the arraying direction of the membrane elements 51. The partitions 101 and 102 are in parallel with side walls 71*a* and 71*b* of the skirt element 71. Thus, the partitions 101 and 102 and the side walls 71*a* and 71*b* define compartments 106 and 107, respectively, in a symmetric manner with respect to the center of the partition unit.

Partitions 103 and 104 are disposed within a space defined by the partitions 101 and 102 at two opposite positions located in the arraying direction of the membrane elements 51 in such a manner as to extend in the width direction of the membrane unit 50. The partitions 103 and 104 are in parallel with side walls 71*c* and 71*d* of the skirt element 71. Thus, the partitions 103 and 104 and the side walls 71*c* and 71*d* define compartments 108 and 109 symmetrically with respect to the center of the partition unit.

Thus, the compartments 106 to 109 are formed along four walls of the skirt element 71, whereas the compartment 105 is defined by the partitions 101 to 104.

Accordingly, not only are the membrane surfaces 52 sufficiently cleaned at their opposite side edge portions as viewed in the width direction of the membrane unit 50, but also the membrane surfaces 52 located at opposite end portions of an array of the membrane elements 51 can be sufficiently cleaned.

Next, a third embodiment of the present invention will be described.

Figure 12:
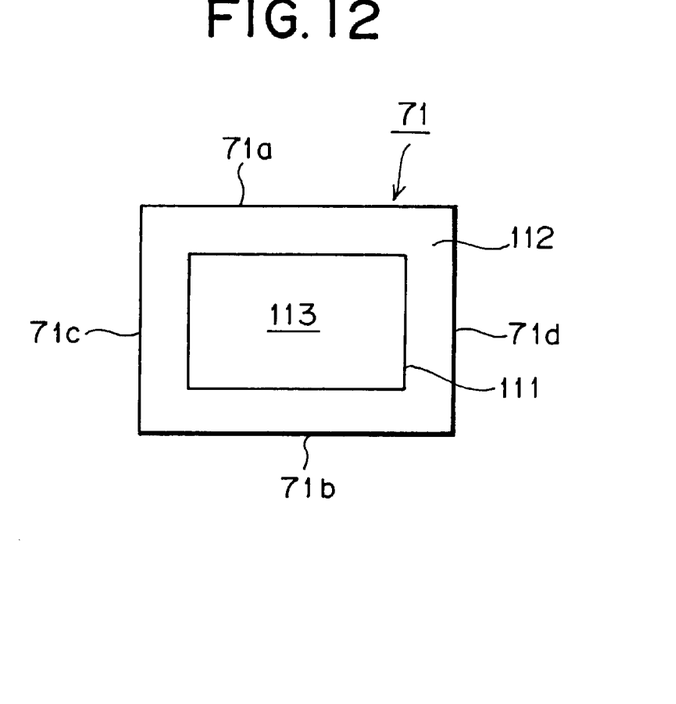
FIG. 12 is a plan view of a partition unit according to a third embodiment of the present invention.
Figure 13:
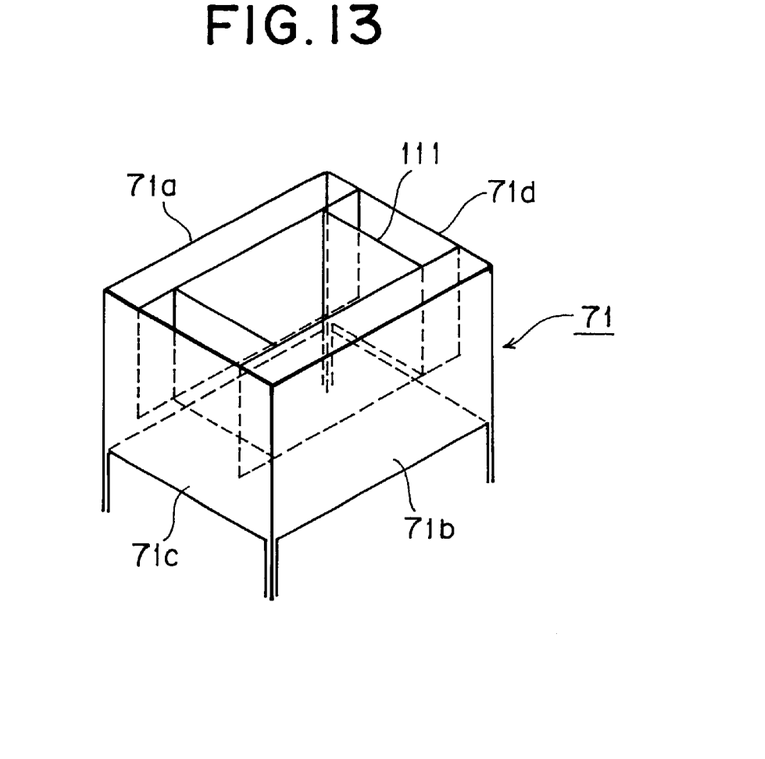
FIG. 13 is a perspective view of the partition unit according to the third embodiment.

FIG. 12 shows a plan view of a partition unit according to a third embodiment of the present invention. FIG. 13 shows a perspective view of the partition unit according to the third embodiment.

A partition 111 is disposed within a space defined by the skirt element 71 in parallel with the side walls 71a to 71d of the skirt element 71. The partition 111 and the four side walls 71a to 71d of the skirt element 71 define a compartment 112 symmetrically with respect to the center of the partition unit. The partition 111 also defines a compartment 113 inside.

Accordingly, not only are the membrane surfaces 52 sufficiently cleaned at their opposite side edge portions as viewed in the width direction of the membrane unit 50 (FIG. 4), but also the membrane surfaces 52 located at opposite end portions of an array of the membrane elements 51 can be sufficiently cleaned.

Next, a fourth embodiment of the present invention will be described.

Figure 14:
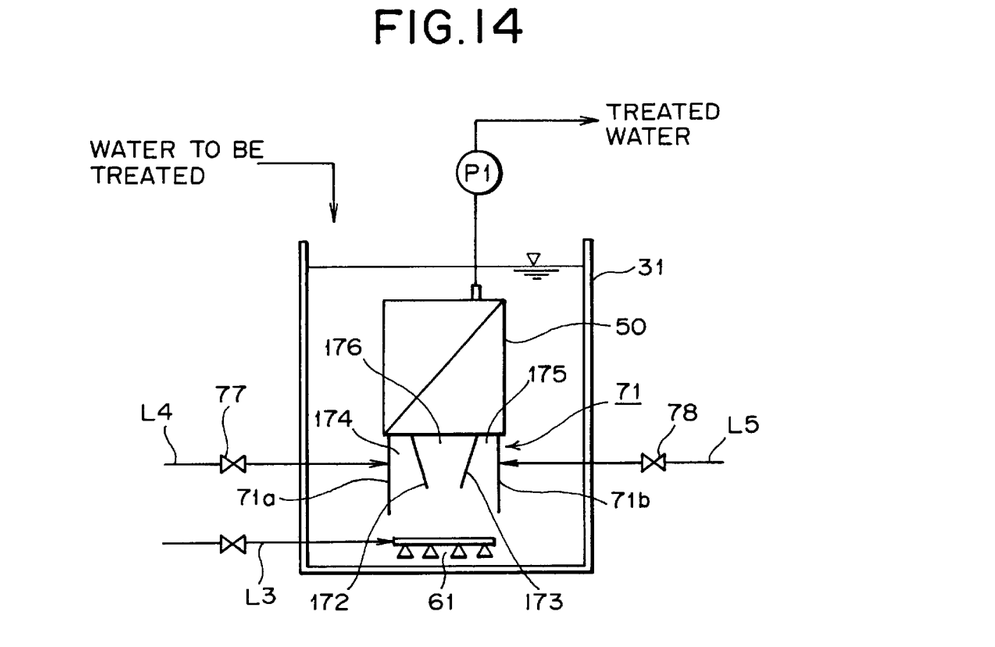
FIG. 14 is a schematic view of a membrane filter apparatus according to a fourth embodiment of the present invention.
Figure 15:
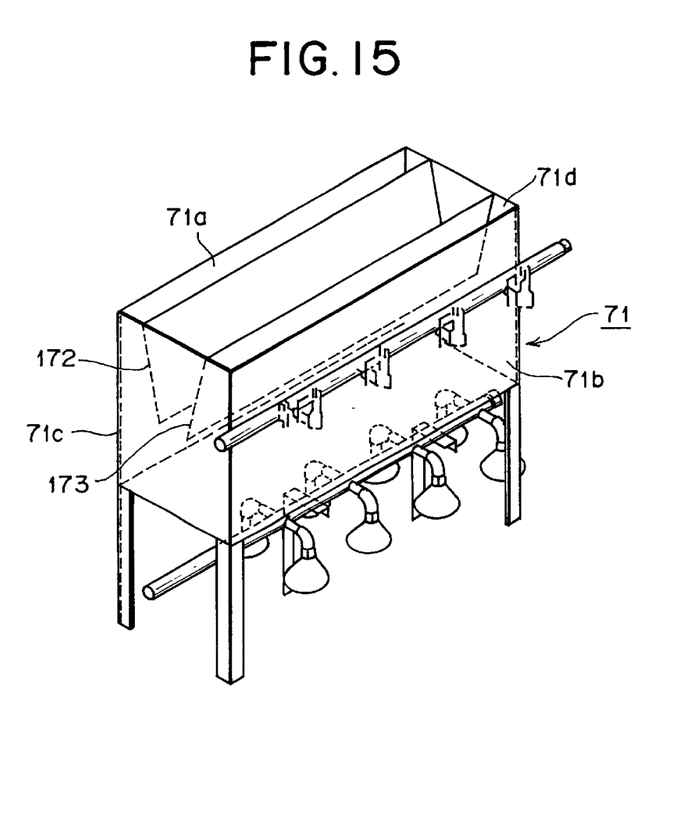
FIG. 15 is a perspective view of a main portion of the membrane filter apparatus according to the fourth embodiment.

FIG. 14 shows a schematic view of a membrane filter apparatus according to a fourth embodiment of the present invention. FIG. 15 shows a perspective view of a main portion of the membrane filter apparatus according to the fourth embodiment. The same features as those of the first embodiment are denoted by common numerals, and their description will be omitted.

Partitions 172 and 173 are disposed within a space defined by the skirt element 71 at two widthwise opposite positions of the membrane unit 50 such that they extend along the arraying direction of the membrane elements 51 (FIG. 4). The partitions 172 and 173 are slanted with respect to the side walls 71a and 71b of the skirt element 71. The partitions 172 and 173 and the side walls 71a and 71b define compartments 174 and 175, respectively, whereas the partitions 172 and 173 define a compartment 176.

Since the partitions 172 and 173 are slanted such that their bottom ends are biased toward the center of the skirt element 71, the compartments 174 and 175 narrow upward, thereby increasing the rising velocity of the bubbles 16 and water to be treated within the compartments 174 and 175.

Also, when gas is discharged from the aerator 61, more bubbles 16 are supplied into the compartments 174 and 175. Accordingly, more bubbles 16 flow upward along the opposite side edge portions of the membrane surface 52, thereby sufficiently cleaning the entire membrane surface 52. In this case, the regulating valves 77 and 78 may be closed.

Next, a fifth embodiment of the present invention will be described.

Figure 16:
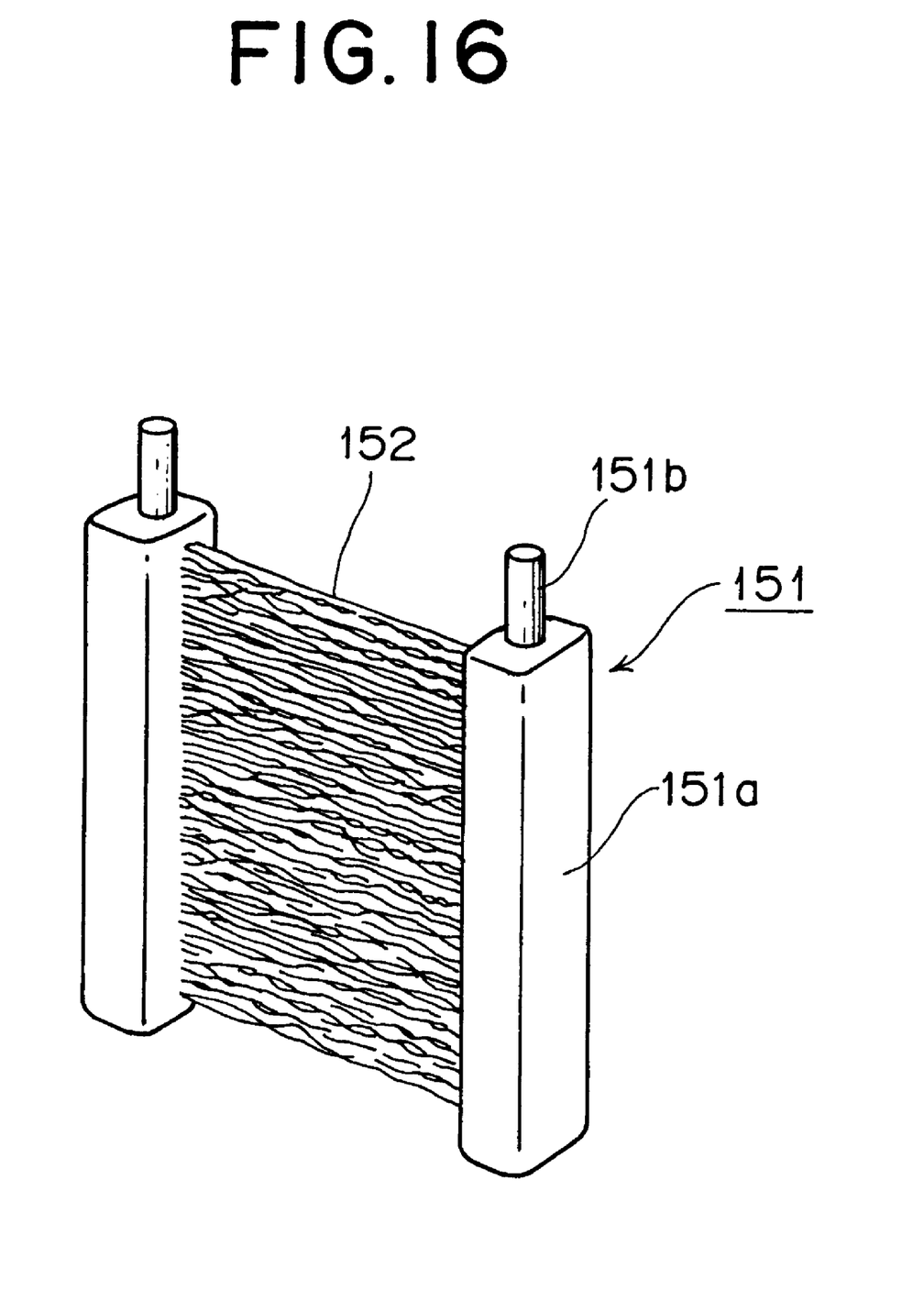
FIG. 16 is a perspective view of a main portion of a membrane element according to a fifth embodiment of the present invention.

FIG. 16 shows a perspective view of a main portion of a membrane element according to the fifth embodiment of the present invention.

In FIG. 16, numeral 151 denotes a membrane element in a flat modular form made of a hollow yarn membrane or tubular membrane; numeral 151a denotes a frame; numeral 151b denotes a manifold nozzle formed at the top end of the frame 151a; and numeral 152 denotes the surface of a hollow yarn membrane.

The present invention is not limited to the above-described embodiments. Numerous modifications and variations of the present invention are possible in light of the spirit of the present invention, and they are not excluded from the scope of the present invention.

What is claimed is:

1. A method for operating a membrane filter apparatus comprising a treatment tank; a membrane unit disposed within the treatment tank and composed of an array of membrane elements extending in an arraying direction; a tubular skirt element having a first end disposed at a bottom of the membrane unit and a second end positioned adjacent a bottom of said tank;

an aerator disposed under said skirt element and adapted to discharge gas;

at least one partition disposed at a bottom portion of said membrane unit along the arraying direction and extending downwardly therefrom a major portion of the distance between said first end and said second end of said skirt element, said at least one partition and said skirt element defining at least two compartments within said skirt element; and gas supply means for supplying gas into the at least two compartments, said method comprising a step of selectively supplying gas into the compartments.

* * * * *